United States Patent
Kothari et al.

(10) Patent No.: US 10,521,172 B2
(45) Date of Patent: Dec. 31, 2019

(54) RESOURCE PROVISIONING

(71) Applicant: Hewlett-Packard Development Company, L.P., Houston, TX (US)

(72) Inventors: Sunil Kothari, Palo Alto, CA (US); Jun Zeng, Palo Alto, CA (US); Thomas J Peck, Corvallis, OR (US); Michael L Reasoner, Corvallis, OR (US); Gary J Dispoto, Palo Alto, CA (US); Francisco Jose Oblea Ramirez, Guadalajara (MX)

(73) Assignee: Hewlett-Packard Development Company, L.P., Spring, TX (US)

( * ) Notice: Subject to any disclaimer, the term of this patent is extended or adjusted under 35 U.S.C. 154(b) by 184 days.

(21) Appl. No.: 15/522,724

(22) PCT Filed: Dec. 19, 2014

(86) PCT No.: PCT/US2014/071445
§ 371 (c)(1),
(2) Date: Apr. 27, 2017

(87) PCT Pub. No.: WO2016/099545
PCT Pub. Date: Jun. 23, 2016

(65) Prior Publication Data
US 2017/0322758 A1    Nov. 9, 2017

(51) Int. Cl.
*G06F 3/12* (2006.01)
*G06F 16/435* (2019.01)
(Continued)

(52) U.S. Cl.
CPC ............ *G06F 3/1263* (2013.01); *G06F 3/124* (2013.01); *G06F 3/1211* (2013.01);
(Continued)

(58) Field of Classification Search
CPC ...... G06Q 10/06; G06Q 10/10; G06F 3/1211; G06F 3/1204; G06F 3/1205; G06F 9/5011; G06F 9/2072; G06F 3/126
See application file for complete search history.

(56) References Cited

U.S. PATENT DOCUMENTS 6,970,261 B1    11/2005 Robles
6,987,578 B2    1/2006 Alexander
(Continued)

FOREIGN PATENT DOCUMENTS

CN    1825273 A    8/2006
CN    102597945 A    7/2012
(Continued)

OTHER PUBLICATIONS

Zhang, Hua et al, "Dynamic Job-Shop Scheduling with Urgent Orders Based on PetriNet and GASA", Jun. 17-19, 2009.
HP-UX Workload Manager Toolkits User's Guide, Apr. 19, 2005.

*Primary Examiner* — Quoc A Tran
(74) *Attorney, Agent, or Firm* — HP Inc. Patent Department

(57) ABSTRACT

Systems and methods associated with resource provisioning are disclosed. One example method includes dividing a set of printing resources into a first partition and a second partition. The example method also includes provisioning the first partition to handle print jobs from a print queue that have a specified attribute. The first partition may be provisioned when print jobs having the specified attribute exceed a first predefined threshold.

15 Claims, 6 Drawing Sheets

(51) Int. Cl.
    *G06Q 10/10*     (2012.01)
    *G06F 9/50*     (2006.01)
    *G06Q 10/06*     (2012.01)
    *G06F 17/00*     (2019.01)

(52) U.S. Cl.
    CPC .......... *G06F 3/1215* (2013.01); *G06F 16/437* (2019.01); *G06F 3/1204* (2013.01); *G06F 3/1205* (2013.01); *G06F 3/126* (2013.01); *G06F 9/5011* (2013.01); *G06Q 10/06* (2013.01); *G06Q 10/10* (2013.01)

(56) References Cited

U.S. PATENT DOCUMENTS

| | | |
|---|---|---|
| 7,502,747 B1 | 3/2009 | Pardo |
| 7,509,641 B2 | 3/2009 | Phenix et al. |
| 7,813,993 B1 | 10/2010 | Barto et al. |
| 7,941,236 B2 | 5/2011 | Spearman |
| 7,995,225 B2 | 8/2011 | Lofthus et al. |
| 8,468,527 B2 | 6/2013 | Rai |
| 8,520,254 B2 | 8/2013 | Rai |
| 8,544,017 B1 | 9/2013 | Prael et al. |
| 2003/0076525 A1 | 4/2003 | Hikawa |
| 2004/0196470 A1* | 10/2004 | Christiansen ......... G06F 3/1204 358/1.1 |
| 2010/0082138 A1 | 4/2010 | Hayes et al. |
| 2013/0100483 A1* | 4/2013 | Henry ................ G06K 15/1863 358/1.15 |
| 2013/0314739 A1 | 11/2013 | Tippetts |

FOREIGN PATENT DOCUMENTS

| | | |
|---|---|---|
| EP | 1122635 | 8/2001 |
| EP | 2017719 | 1/2009 |
| WO | WO-2009032776 | 3/2009 |

* cited by examiner

RESOURCE PROVISIONING

BACKGROUND

Companies providing printing services often maintain numerous machines performing a variety of tasks involved in the printing production line. These machines may include, for example, printers, rasterizers, cutting machines, folders, binders, hole drillers, and so forth in some cases, to fulfil demand, the companies may maintain multiple identical machines, or several machines that perform the same or similar tasks (e.g., large format printing, Laserjet printing). Multiple machines may allow the printing company to increase overall throughput, to handle different types of jobs, to account for throughput differences between different types of machines, and so forth.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Systems and methods associated with resource provisioning are described. Resource provisioning may be achieved by dividing a set of resources (e.g., printing resources) into a number of partitions. Then, when a set of jobs (e.g., print jobs) to be handled by the set of resources meets some predefined threshold, one or more of the partitions may be provisioned to specifically handle jobs associated with the predefined threshold. By way of illustration, if a number of print jobs marked as urgent in a print queue exceeds a certain value, a partition of resources may be designated as an express lane that specifically handles these urgent jobs. Other partitions may handle unmarked jobs as normal.

When the number of urgent jobs is no longer above the predefined threshold, or falls fellow a second threshold, the partition may be deprovisioned. This may allow resources that might otherwise be idle or underutilized to process other pending jobs when there are few urgent jobs. Consequently, systems and methods described herein may facilitate maintaining certain quality of service guarantees when there is a large demand for resources, while ensuring resources are not left idle when the demand for resources is lower.

Figure 1:
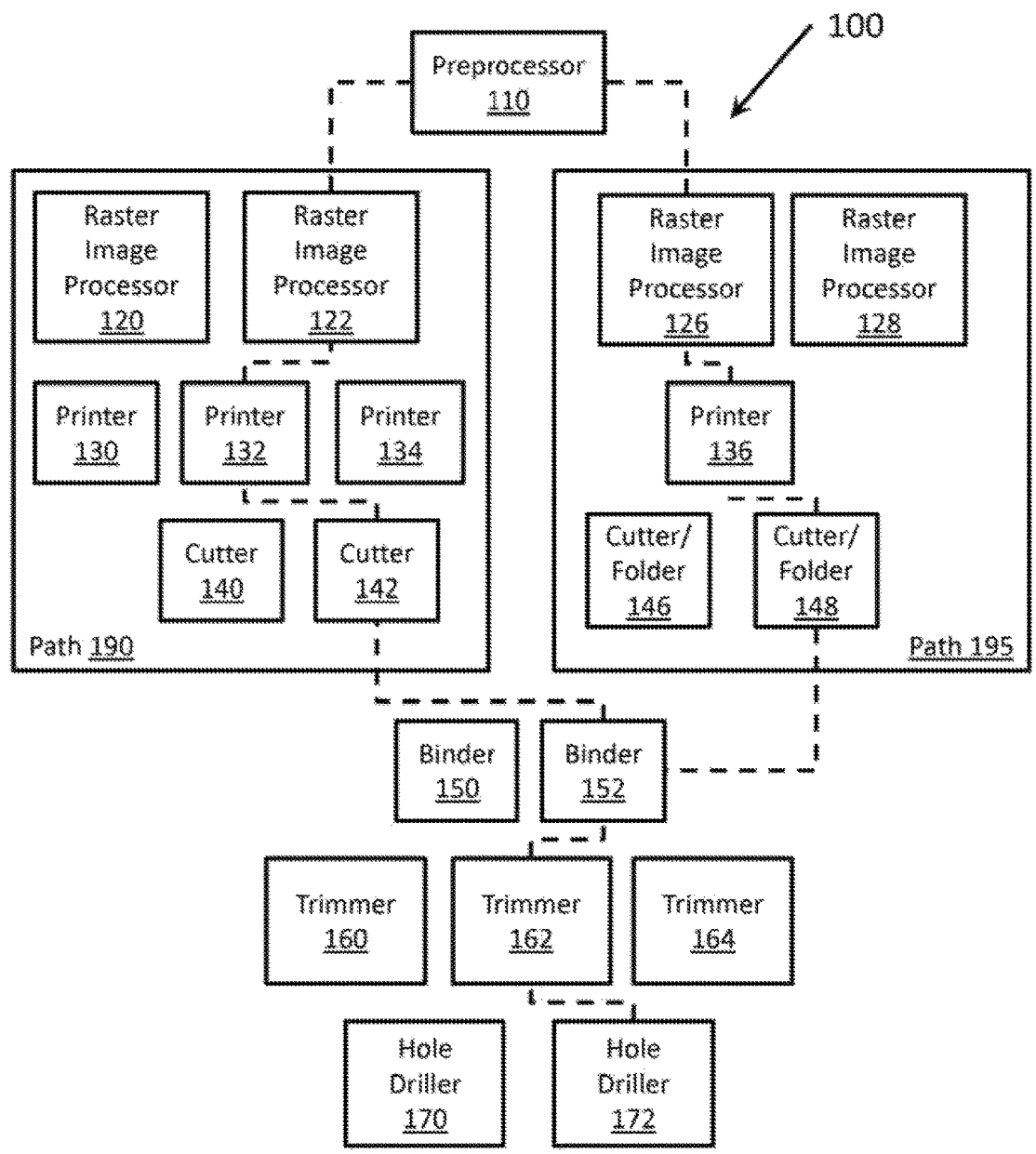
FIG. 1 illustrates an example printing resources on which example systems and methods, and equivalents may operate.

FIG. 1 illustrates example printing resources 100 on which example systems and methods, and equivalents may operate. It should be appreciated that printing resources 100 depicted in FIG. 1 are arranged in an illustrative example of a process flow and that different businesses may operate using differing configurations and numbers of printing resources 100. Further, systems and methods, and equivalents, described herein may operate using a variety of technologies and configurations. Additionally, though FIG. 1 relates to an example involving printing resources, systems and methods, and equivalents may operate in other technology areas that involve multiple stages and/or machines (e.g., manufacturing, healthcare, 3-D printing).

Printing resources 100 include a preprocessor 110. Preprocessor 110 may be, for example, a computer designed to receive print jobs (e.g., over a network connection), evaluate the requirements of the print jobs, and based on these requirements, select other printing resources that will be used to fulfill the print jobs.

Based on the requirements of a print job, preprocessor 110 may, in this example, route the jobs along one of two workflow paths 190 and 195. Workflow paths 190 and 195 may include different types of devices that are designed to fulfill different types of jobs. For example, workflow path 190 may include printing resources more appropriate for print jobs related to posters and/or pamphlets, while workflow path 195 may contain printing resources more appropriate for print jobs related to educational books or photobooks. Consequently, though the paths may contain similarly titled devices (e.g., both workflow path 190 and workflow path 195 contain raster image processors) the devices in the paths may be differently designed devices that are specialized towards completing the jobs towards which their respective workflow paths are geared. Additionally, internally to the workflow paths, the devices may be further specialized as appropriate.

In this example, workflow path 190 contains two raster image processors, 120 and 122, three printers, 130, 132, and 134 and two cutters, 140 and 142. Workflow path 195 contains two raster image processors, 126 and 128, one printer 136, and two cutter/folders, 146 and 148. The differences between the numbers of units within workflow paths 190 and 195 may relate to, for example, device throughput, expected incoming business of a company operating printing resources 100, and so forth.

Workflow paths 190 and 195 also contains several shared resources. In this example, binders 150 and 152, trimmers 160, 162, and 164, and hole drillers 170 and 172 may be shared resources that may be unspecialized devices that may operate on most jobs regardless of whether a job is associated with workflow path 190 or workflow path 195. These resources may be shared because, for example, many different types of jobs require binding, trimming, hole drilling, and so forth, and the devices operate effectively on jobs coming through either workflow path 190 or workflow path 195, and so forth.

In some circumstances, the company operating printing resources 100 may maintain service level agreements with various customers that require certain quality of service guarantees. These guarantees may be related to, for example, quality, timeliness, error rate, and so forth. In some cases the customers may pay extra fees for these quality of service guarantees. For example, if a customer needs a job to be completed quickly, the customer may pay a fee for the job to be marked as urgent and/or otherwise prioritized to meet a need of the customer. If, in a certain time period, the number of urgent jobs received is enough to fully load one or more printing resources 100, it may be desirable to devote a subset of printing resources 100 to these types of jobs. Consequently, partitions of printing resources 100 may be created, and one of the partitions may be assigned to handle the jobs marked as urgent, effectively creating an express lane for these types of jobs. Other jobs not marked as urgent may be handled by a different partition of the printing resources.

Other reasons for partitioning and provisioning an express lane from existing printing resources may also be used. For example, if some service level agreements are not being met, an express lane may be generated to ensure that these jobs are processed appropriately. In another example, jobs from a certain customer may be provisioned an express lane to, for example, entice the customer to increase business, in anticipation of abnormally high business from the customer, and so forth.

In FIG. 1, the dashed lines indicate an example partition of resources that may be dedicated as an express lane for a certain type of job (e.g., urgent jobs). By way of illustration, the express lane for path 190 begins at preprocessor 110, uses raster image processor 122, printer 132, cutter 142, binder 152, trimmer 162, and hole driller 172. The express lane for path 195 uses raster image processor 126, printer 136, cutter/folder 148, binder 152, trimmer 162, and hole driller 172. It should be noted that some printing resources may be a part of multiple express lane partitions (e.g., preprocessor 110, binder 152, trimmer 162, and hole driller 172), and some printing resources may be a part of both an express lane partition and a non-express lane partition (e.g., printer 136).

Partitions based on other criteria may also be appropriate. For example, it may be efficient to allocate jobs having similar sizes to the same machine. This may enhance productivity when, for example, jobs having relatively smaller sizes with a variety of attributes differing between the jobs are sent to a resource that is more adaptable to jobs of differing sizes. In this case, larger, more uniform jobs may be sent to higher efficiency machines that are less able to adapt on the fly. In another example, when a large client of a company operating printing resources 100 has negotiated certain quality of service guarantees, it may be appropriate to allocate jobs from this client to a dedicated partition.

Eventually, however, if the number of jobs that were and/or will be allocated to the dedicated partition falls below a threshold for a given time period, it may make sense to depression dedicated partition and open the partition to other jobs. Reopening the partition may ensure that resources do not remain idle while there are jobs available to complete. Other deprovisioning scenarios may also be appropriate. For example, if partitions are designed to dynamically initiate in several different provisioning scenarios, a scenario with a relatively higher priority coming into effect while a partition is provisioned for a relatively lower priority scenario may cause the partition for the lower priority scenario to be deprovisioned from the partition and the higher priority scenario to be provisioned to the partition.

In one example, the partitioning of the printing resources 100 may be performed by preprocessor 110. Preprocessor 110 may be able to evaluate the print jobs and identify attributes of the print jobs and the best way to partition printing resources 100 based on the attributes of the print jobs. In another example, the partitioning may be initiated in response to an event. The event may be, a known time period where a larger than typical number of jobs is handled by the company operating printing resources 100. For example, a holiday period where many jobs are handled may be a desirable time to initiate partitioning of the resources. As the period draws down, the partitioning may be automatically ended when the number of pending print jobs begins to draw down. Provisioning and/or deprovisioning the partitions during the holiday period may occur, for example, on a daily basis, on a weekly basis, on an ad hoc basis based on the attributes of currently pending jobs, and so forth. Alternatively, a maintenance event for a printing resource 100 may trigger partitioning of printing resources 100. By way of illustration, if printer 130 breaks, primers 132 and 134 may be needed to handle the jobs performed by printer 130 in addition to their normal load. Consequently, printers 132 and 134 may be partitioned and provisioned to handle different types of jobs to ensure quality of service guarantees are met during the maintenance of printer 130.

In some scenarios, it may be appropriate for a partitioning and/or provisioning of resources to occur each time a task is allocated to the resources. If the provisioning is designed to occur only in specific scenarios, most assignments of tasks to resources may follow a single policy. However, when one of the scenarios is in effect, the assignment of tasks may deviate from the single policy in a manner that allocates tasks to resources more efficiently when that scenario is an effect. Consequently, this dynamic allocation of tasks to resources may improve efficiency of companies who process jobs involving a variety of related resources (e.g., printing, manufacturing, 3-D printing, healthcare).

In some examples, this dynamic allocation may be implemented using a several constructs that control allocation of tasks to resources. These constructs may include, for example, expressions that dictate scenarios when resources may be more efficiently allocated using a non-standard allocation of tasks to resources. The constructs may also include descriptions of partitions of resources. In some examples, either the scenario expressions or partition descriptions may indicate when it is appropriate to allocate a task to a specific partition. The constructs may also contain other limitations that prevent, for example, overloading a partition in a manner that may leave other resources without tasks to process.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

Figure 2:
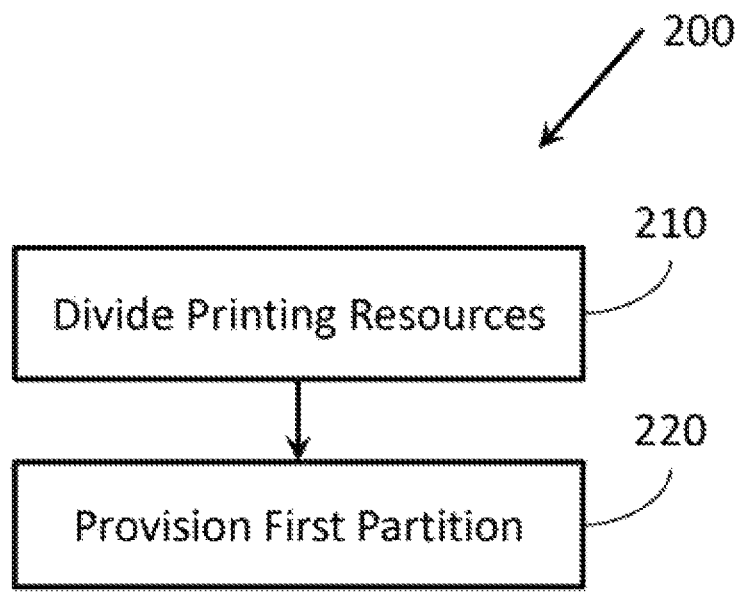
FIG. 2 illustrates a flowchart of example operations associated with resource provisioning.

FIG. 2 illustrates a method 200 associated with resource provisioning. Method 200 may be embodied on a non-transitory computer-readable medium storing computer-executable instructions. The instructions, when executed by a computer may cause the computer to perform method 200. In other examples, method 200 may exist within logic gates and/or RAM of an application specific integrated circuit.

Method 200 includes dividing a set of printing resources at 210. The set of printing resources may be divided into a first partition and a second partition. Though reference is made to a first partition and a second partition, it is possible that the set of printing resources may be divided into more partitions. The set of printing resources may include a variety of machines that perform various functions to achieve a printing workflow. By way of illustration, the printing resources may include several raster image processors, printers, folders, cutters, and other devices that facilitate completion of print jobs by a company operating the printing resources and performing method 200. The printing resources may also include devices that are specialized towards achieving certain workflows. For example, some printers may be specialized towards printing for books or newspapers, while other printers may be specialized towards printing posters or product labels. Dividing the set of printing resources into the first partition and the second partition may involve selecting a set of printing resources capable of achieving a workflow to process that workflow separately from other printing resources. This may facilitate further specializing these printing resources, prioritizing jobs, and so forth.

The dividing may be initiated in response to, for example, a calendar event, a maintenance event, and so forth. The calendar event may be a known time period during a year in which demand for printing resources is abnormally high. The maintenance event may be caused by for example, a printing resource breaking and requiring repairs for a period of time during which other printing resources will need to cover the load typically handled by the broken printing resources.

In one example, dividing the set of printing resources into the first partition and the second partition may include analyzing the set of printing resources and requirements of print jobs in the print queue to generate the division of printing resources. The requirements of print jobs may include, for example, timing constraints (e.g., urgent jobs), printer settings (e.g., margins), job types (e.g., books, posters), job sizes, and so forth. By way of illustration, certain printing resources may be better at handling higher volume jobs where there is little variation between each element, while other printing resources may be better at handling numerous smaller jobs where each job has different specifications. Though either type of printing resource could be capable of performing the other type of job, dividing the printing resources info the first partition and the second partition based on their specializations when the print jobs contains both types of jobs may leverage the device specialties.

Method 200 also includes provisioning the first partition at 220. The first partition may be provisioned to handle print jobs from a print queue that have a specified attribute. The specified attribute may be, for example, a flag that marks print jobs as urgent print jobs, a size of a print job, a client associated with a print job, and an option associated with a print job. The first partition may be provisioned when print jobs having the specified attribute exceed a first predefined threshold. The first predefined threshold may relate to, for example, a number of print jobs having the specified attribute, a combined size of print jobs having the specified attribute, a percentage of print jobs having the specified attribute, and so forth. The predefined threshold may also relate to a combination of circumstances (e.g., calendar events, maintenance events) and/or attributes (e.g., number of jobs having a relatively low unit count requiring a certain printing resource type).

Figure 3:
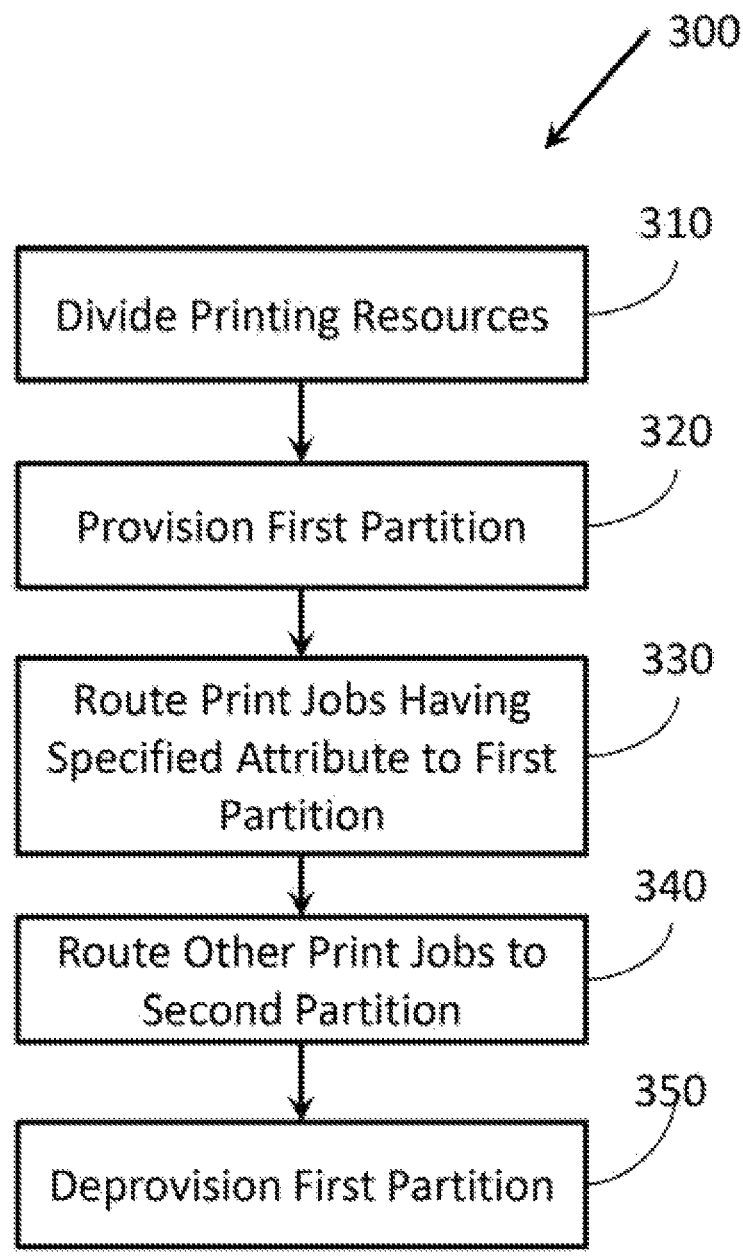
FIG. 3 illustrates another flowchart of example operations associated with resource provisioning.

FIG. 3 illustrates a method 300. Method 300 includes several actions similar to those described above with reference to method 200 (FIG. 2). For example, method 300 includes dividing printing resources into a first partition and a second partition at 310, and provisioning the first partition at 320.

Method 300 also includes routing print jobs having the specified attribute to the first partition at 330. Method 300 also includes routing other print jobs to the second partition at 340. Routing print jobs having the specified attribute to the first partition may create an express lane for print jobs having the specified attribute. This may facilitate maintaining a certain quality of service for the print jobs having the specified attribute. By way of illustration, when a customer has paid to have a print job completed quickly (e.g., an urgent job), having an express lane that processes these types of jobs may ensure that printing resources are available to process the job to meet the customer's demand. In another example, having a partition designed to handle smaller jobs and a partition designed to handle handling larger jobs may facilitate leveraging equipment specializations.

Method 300 also includes deprovisioning the first partition from handling print jobs having the specified attribute at 350. The first partition may be deprovisioned when print jobs having the specified attribute fall below a second predefined threshold. Being able to automatically deprovision partitions may facilitate ensuring that printing resources are not left idle while there are no or few print jobs available that would otherwise be routed to that partition.

Figure 4:
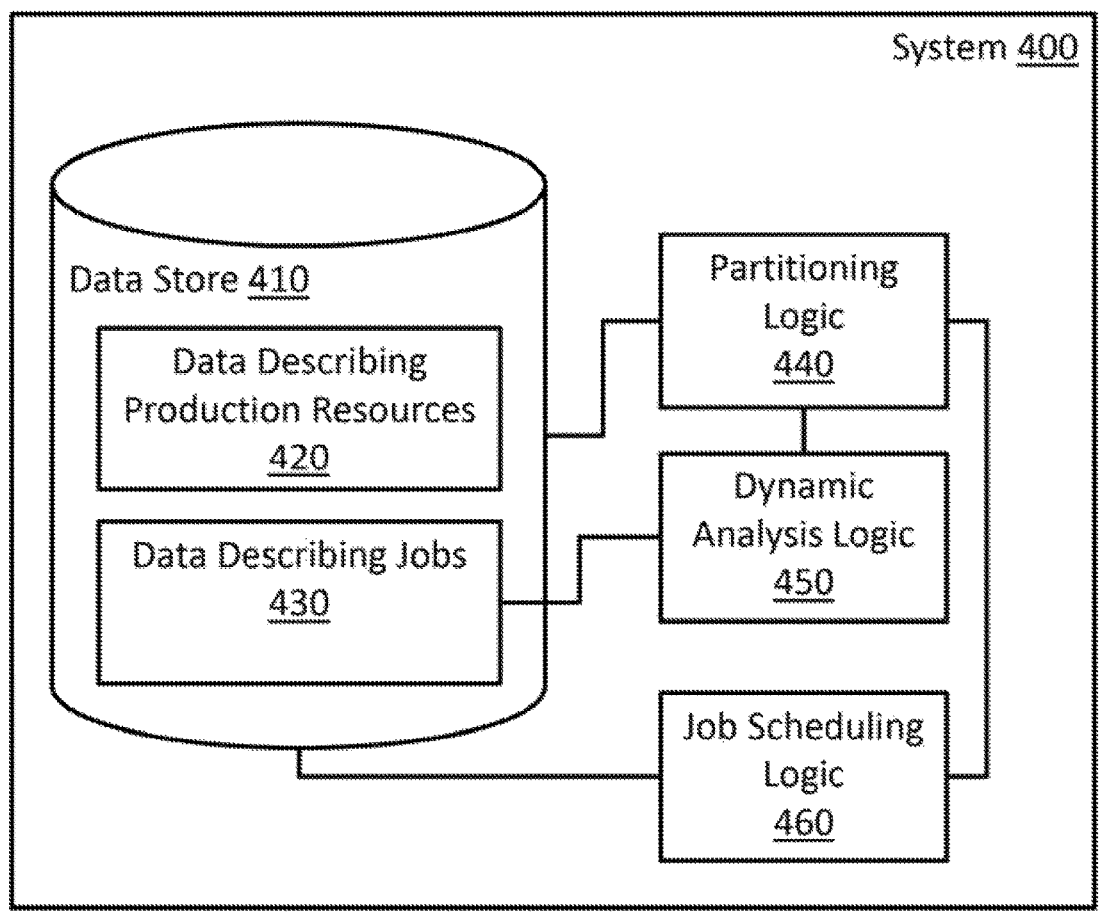
FIG. 4 illustrates an example system associated with resource provisioning.

FIG. 4 illustrates a system 400. System 400 includes a data store 410. Data store 410 stores data 420 describing a set of production resources. The production resources may be, for example, printing resources. However, other production resources (e.g., manufacturing resources, healthcare resources, 3-D printing resources) may also be represented in data store 410. The data 420 describing the production resources may include information regarding what type of functions the production resources perform, what types of jobs production resources are able to fulfil, maintenance status of production resources, historical throughput data for production resources, and so forth. Data store 410 also stores data 430 describing a set of jobs over time. Some members of the set of jobs may be jobs to be completed by the set of production resources. Other members of the set of jobs may include jobs currently being processed production resources and jobs that have already been fulfilled by production resources. The set of jobs may be, for example, a set of print jobs. The type of jobs stored may be related to the type(s) of production resources represented in data store 410.

System 400 also includes a partitioning logic 440. Partitioning logic 440 may divide the set of production resources into a first partition and a second partition. Partitioning logic 440 may divide the set of production resources based on the data 420 describing the set of production resources and the data 430 describing the set of jobs. By way of illustration, partitioning logic 440 may divide the set of production resources so that the first partition will be focus on completing jobs having a specific attribute or set of attributes. Partitioning logic 440 may attempt to divide the set of production resources in a manner that ensures that the production resources will operate efficiently (e.g., by limiting unnecessary idle time) based on the current set of jobs.

System 400 also includes a dynamic analysis logic 450. Dynamic analysis logic 450 may monitor the data 430 describing the set of jobs over time. As mentioned above, the data 430 describing the set of jobs over time may include, for example, data describing past jobs, data describing jobs currently being processed by production resources, data describing future jobs, and so forth. Dynamic analysis logic 450 may also control partitioning logic 440 to divide the set of production resources into the first partition and the second partition. Dynamic analysis logic 450 may control the partitioning logic based on attributes associated with the members of the set of jobs. By way of illustration, dynamic analysis logic may control the partitioning logic to divide the set of production resources based on a quantity of jobs from the set of jobs designated as urgent jobs. In this illustration, the first partition may be assigned to handle jobs from the set of jobs designated as urgent jobs, and the second partition may be assigned to handle other jobs from the set of jobs.

In one example, dynamic analysts logic 450 may constantly scan the data 420 describing the set of production resources and the data 430 describing the set of jobs to see if express lanes should be provisioned and/or deprovisioned. The scenarios in which production resources are provisioned may be maintained in dynamic analysis logic using a set of predetermined rules (e.g., symbolic expressions). The rules may dictate, for example, the scope of production resources accessible for provisioning. The scope of production resources accessible for provisioning may range from a limited set of production resources to all production resources available to a company operating system 400. The rules may also dictate types of jobs that are appropriate for generating express lanes. Other rules may also be appropriate.

System 400 also includes a job scheduling logic 460. Job scheduling logic 460 may assign member of the set of jobs to production resources. Job scheduling logic 460 may assign the members of the set of jobs based on attributes of the members of the set of jobs. Job scheduling logic 460 may also assign members of the set of jobs to production resources based on whether the production resources are assigned to the first partition or the second partition. Job scheduling logic 460 may also assign members of the set of jobs based on whether attributes associated with members of the set of jobs exceed a predefined threshold. For example, job scheduling logic may track attributes associated with members of the set of jobs in relation to the predefined threshold, and assign members of the set of jobs to production resources without regard to partitions when the attributes associated with the members of the set of jobs falls below the predefined threshold. Job scheduling logic 460 may also take into account other factors when assigning members of the set of jobs.

Figure 5:
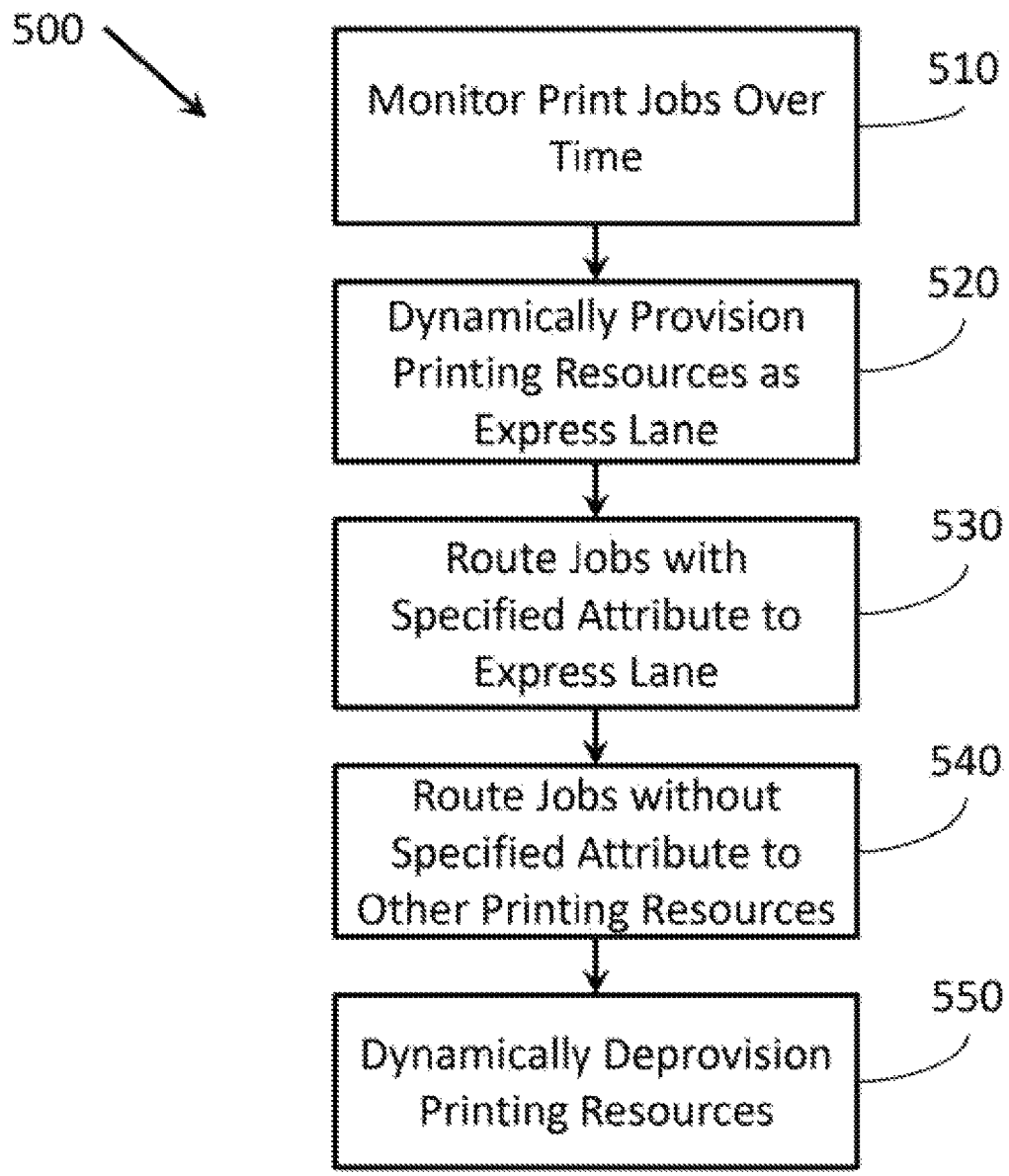
FIG. 5 illustrates another flowchart of example operations associated with resource provisioning.

FIG. 5 illustrates a method 500. Method 500 includes monitoring a set of print jobs over time at 510. The print jobs may be monitored for a specified attribute. The set of print jobs may include print jobs previously completed, print jobs in process, and print jobs to be initiated.

Method 500 also includes dynamically provisioning a set of printing resources as an express lane at 520. The express lane may be associated with the specified attribute. The set of printing resources may be provisioned when print jobs having the specified attribute reaches a predefined threshold for a given time period. By way of illustration, the express lane may be provisioned when a percentage of print jobs marked as urgent jobs reaches the first predefined threshold.

Method 500 also includes routing jobs having the specified attribute to the express lane at 530. Method 500 also includes routing jobs without the specified attribute to other printing resources at 540. Method 500 also includes dynamically deprovisioning the set of printing resources at 550. The set of printing resources may be deprovisioned when print jobs having the specified attribute reaches a second predefined threshold for a given time period.

Figure 6:
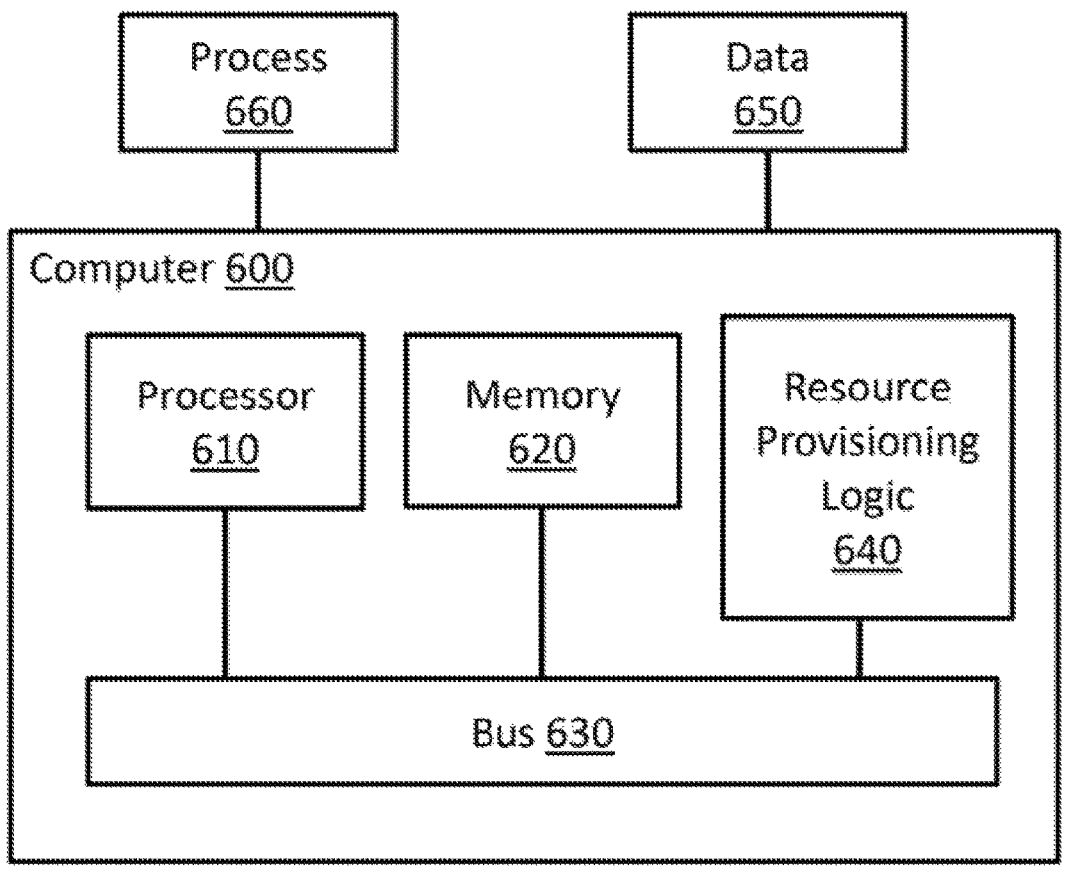
FIG. 6 illustrates an example computing device in which example systems and methods, and equivalents, may operate.

FIG. 6 illustrates an example computing device in which example systems and methods, and equivalents, may operate. The example computing device may be a computer 600 that includes a processor 610 and a memory 620 connected by a bus 630. The computer 600 includes a resource provisioning logic 640. In different examples, resource provisioning logic 640 may be implemented as a non-transitory computer-readable medium storing computer-executable instructions, in hardware, software, firmware, an application specific integrated circuit and/or combinations thereof.

The instructions may also be presented to computer 600 as data 650 and/or process 660 that are temporarily stored in memory 620 and then executed by processor 610. The processor 610 may be a variety of various processors including dual microprocessor and other multi-processor architectures. Memory 620 may include non-volatile memory (e.g., read only memory) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 650. Computer 600 may also be associated with other devices including other computers, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A non-transitory computer-readable medium storing computer-executable instructions that, when executed by a computer, cause the computer to:
   divide a set of printing resources into a first partition and a second partition based on features of the printing resources for achieving a printing workflow, wherein the printing resources comprise devices;
   dynamically provision the printing resources of the first partition to handle print jobs from the print queue that have a specified attribute when print jobs having the specified attribute exceed a first predefined threshold; and
   dynamically deprovision the first partition from handling print jobs having the specified attribute when print jobs having the specified attribute fall below a second predefined threshold.

2. The non-transitory computer-readable medium of claim 1, where the instructions further cause the computer to:
   route print jobs having the specified attribute to the first partition; and route other print jobs to the second partition.

3. The non-transitory computer-readable medium of claim 1, where the specified attribute is associated with one or more of, a flag that marks print jobs as urgent print jobs, a size of a print job, a client associated with a print job, and an option associated with a print job.

4. The non-transitory computer-readable medium of claim 1, where dividing the set of printing resources into the first partition and the second partition includes analyzing the set of printing resources and requirements of print jobs in the print queue to generate the division of printing resources.

5. The non-transitory computer-readable medium of claim 1, where the first predefined threshold relates to one or more of, a number of print jobs having the specified attribute, a combined size of print jobs having the specified attribute, and a percentage of print jobs having the specified attribute.

6. The non-transitory computer-readable medium of claim 1, where the dividing is initiated in response to one or more of a calendar event and a maintenance event.

7. The non-transitory computer-readable medium of claim 1, wherein the printing resources comprises at least one of a processor, an image processor, a printer, a cutter, a binder, a trimmer, or a hole driller, and the first partition comprises at least one of the printing resources to process the print jobs from the print queue that have the specified attribute.

8. A system, comprising:

a data store to store data describing a set of production resources and to store data describing a set of jobs over time;

a processor; and a memory on which is stored instructions, that when executed by the processor, cause the processor to:

divide the set of production resources into a first partition and a second partition based on the data describing a set of production resources and the data describing the set of jobs, wherein the production resources comprise devices;

monitor the data describing the set of jobs and to control, based on attributes associated with the members of the set of jobs, the processor to divide the set of production resources into the first partition and the second partition; and assign members of the set of jobs to production resources based on attributes of the members of the set of jobs, whether the production resources are assigned to the first partition and the second partition, whether the attributes associated with members of the set of jobs exceed a first predefined threshold; and assign members of the set of jobs to production resources without regard to the first partition or the second partition based on whether the attributes associated with members of the set of jobs fall below a second predefined threshold.

9. The system of claim 8, where the production resources are printing resources and where the set of jobs is a set of print jobs.

10. The system of claim 8, wherein the instructions further cause the processor to divide the set of production resources based on a quantity of jobs from the set of jobs designated as urgent jobs.

11. The system of claim 10, where the first partition is assigned to handle jobs from the set of jobs designated as urgent jobs, and where the second partition is assigned to handle other jobs from the set of jobs.

12. The system of claim 8, wherein the instructions further cause the processor to assign members of the set of jobs to production resources without regard to partitions when attributes associated with members of the set of jobs falls below the predefined threshold.

13. The system of claim 8, where the data describing the set of jobs over time includes one or more of, data describing future jobs, data describing past jobs, and data describing jobs currently being processed.

14. A method, comprising: monitoring a set of print jobs over time for a specified attribute, where the set of print jobs includes print jobs previously completed, print jobs in process, and print jobs to be initiated;

divide printing resources into a first partition and a second partition based on features of the printing resources;

dynamically provisioning the printing resources of the first partition as an express lane associated with the specified attribute when print jobs having the specified attribute reach a first predefined threshold for a given time period, wherein the printing resources comprise devices;

routing jobs having the specified attribute to the express lane;

routing jobs without the specified attribute to other printing resources; and dynamically deprovisioning the printing resources of the first partition when print jobs having the specified attribute reaches a second predefined threshold for a given time period.

15. The method of claim 14, where the express lane is provisioned when a percentage of print jobs marked as urgent jobs reaches the first predefined threshold.

* * * * *